Aug. 31, 1965                N. E. ELSAS                3,203,291
                            CUTTING MACHINE
Filed Sept. 2, 1958                                5 Sheets-Sheet 1
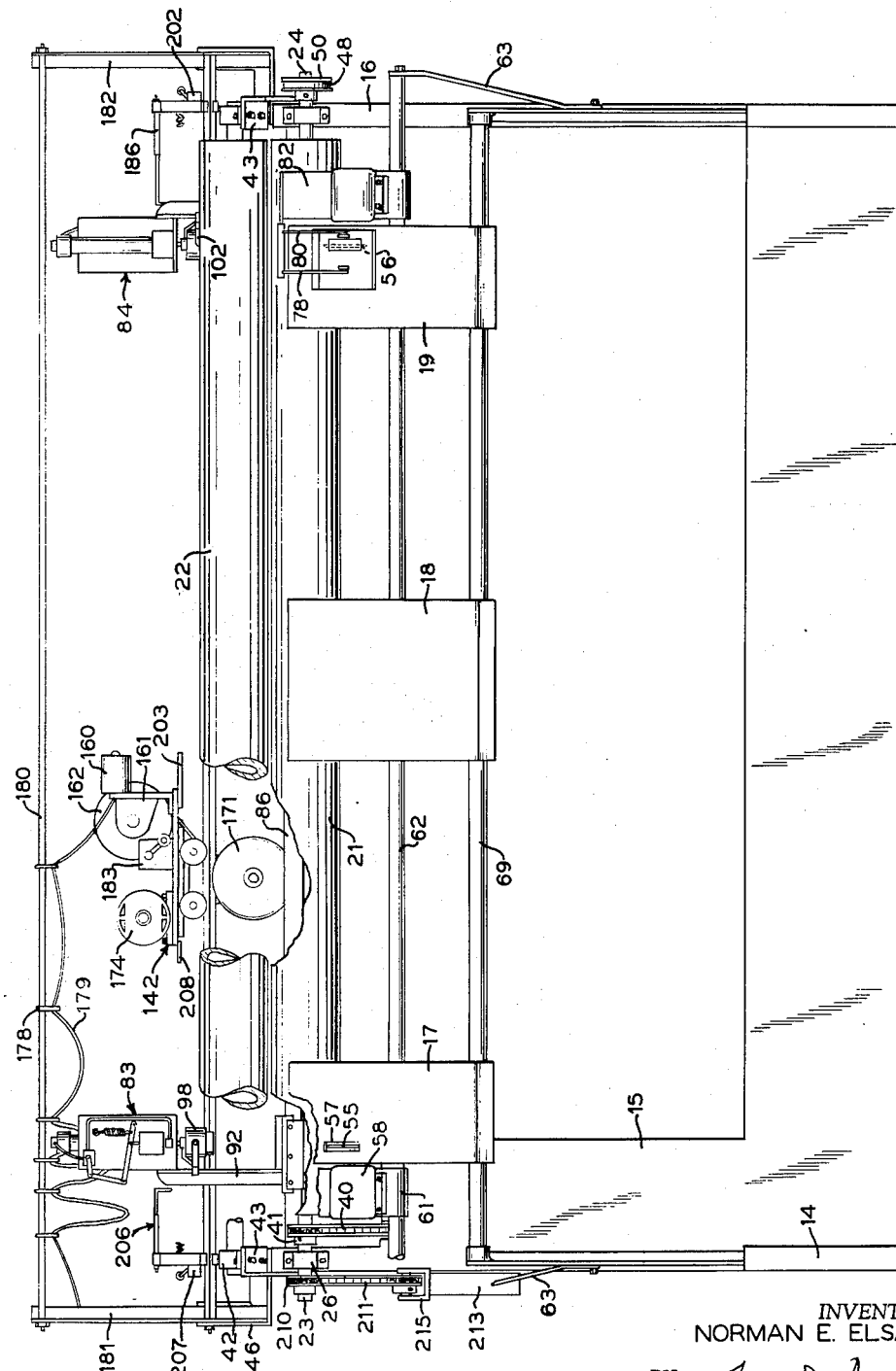
FIG. 1
INVENTOR:
NORMAN E. ELSAS
BY 
ATTORNEY

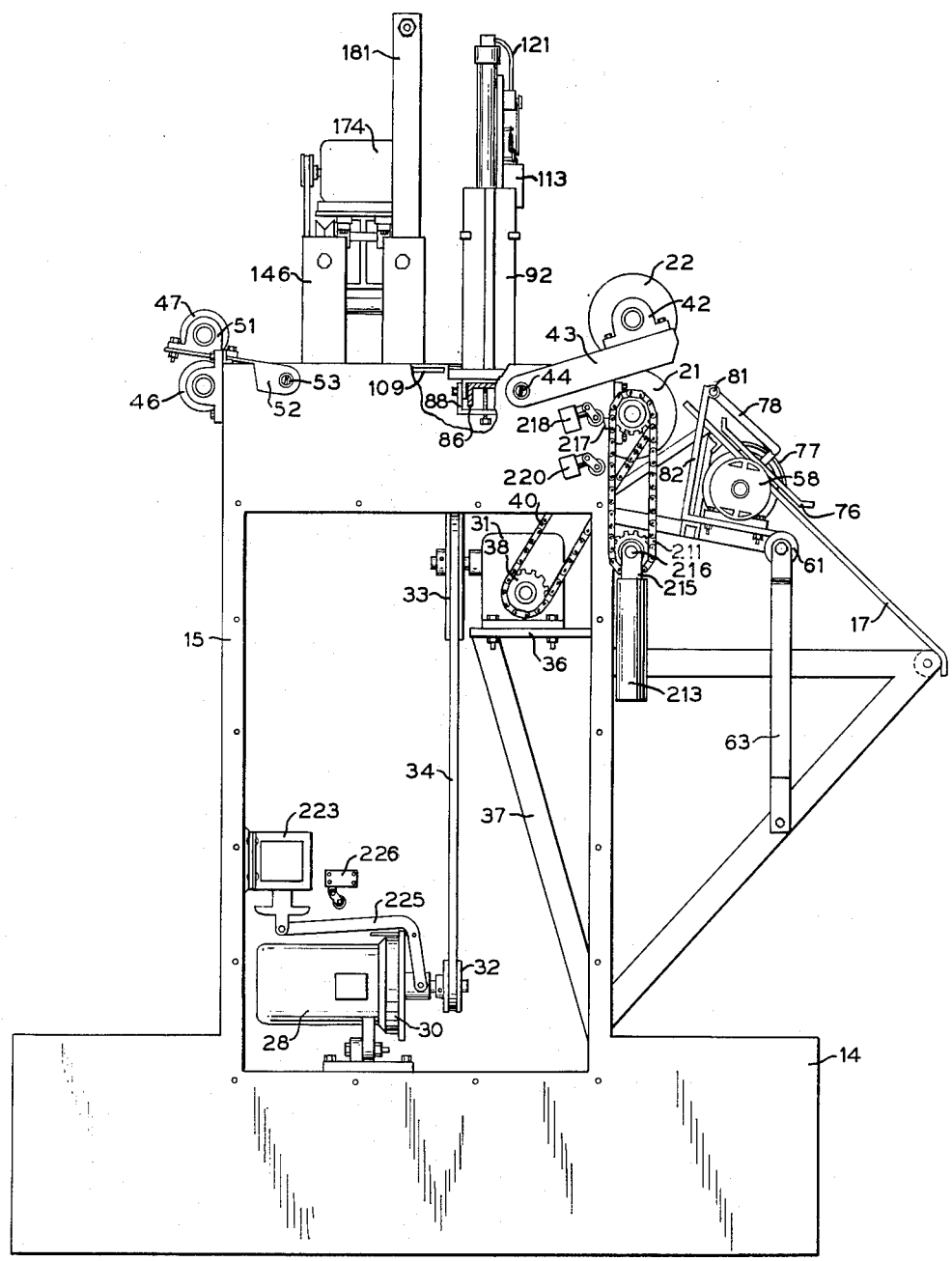
FIG. 2
INVENTOR.
NORMAN E. ELSAS
BY 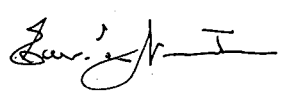
ATTORNEY

Aug. 31, 1965   N. E. ELSAS   3,203,291
CUTTING MACHINE

Filed Sept. 2, 1958   5 Sheets-Sheet 3

*INVENTOR.*
NORMAN E. ELSAS

BY

ATTORNEY

Aug. 31, 1965 N. E. ELSAS 3,203,291
CUTTING MACHINE
Filed Sept. 2, 1958 5 Sheets-Sheet 4

INVENTOR:
NORMAN E. ELSAS
BY
ATTORNEY

Aug. 31, 1965   N. E. ELSAS   3,203,291
CUTTING MACHINE
Filed Sept. 2, 1958   5 Sheets-Sheet 5
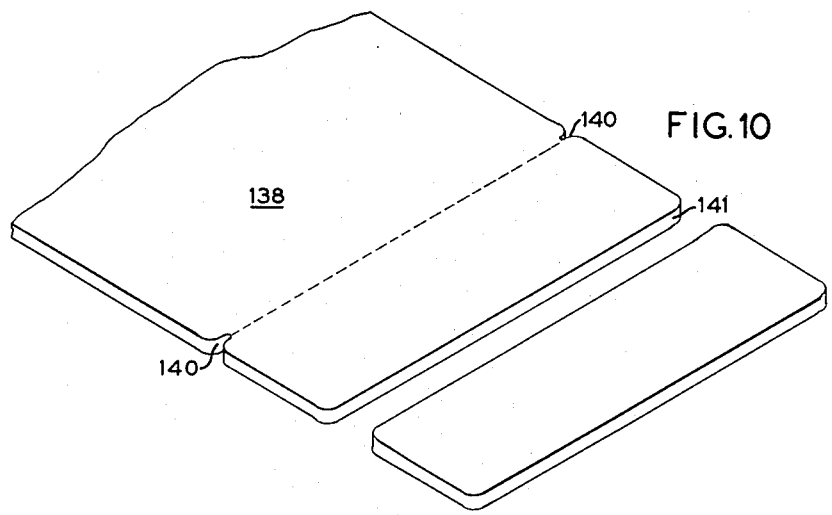
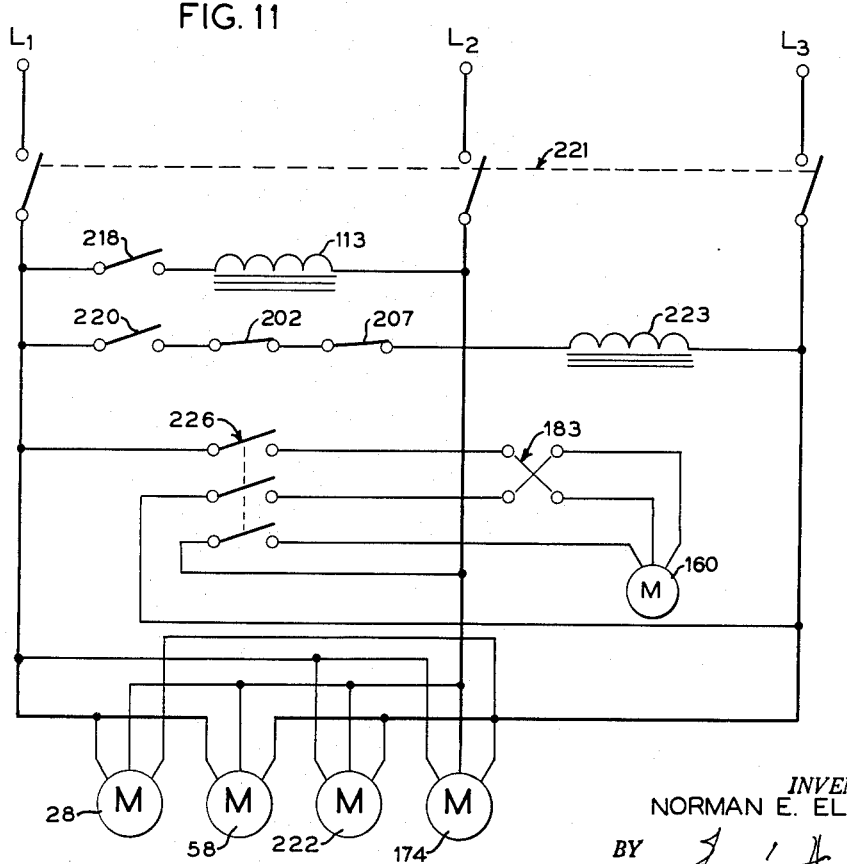
INVENTOR:
NORMAN E. ELSAS
BY
ATTORNEY

United States Patent Office

3,203,291
Patented Aug. 31, 1965

3,203,291
CUTTING MACHINE
Norman E. Elsas, 3081 Maple Drive NE., Atlanta, Ga.
Filed Sept. 2, 1958, Ser. No. 758,234
7 Claims. (Cl. 83—210)

This invention relates to a cutting machine, and is more particularly concerned with the automatic cutting of heavy fabrics, rugs and padding material in predetermined length with or without rounded or otherwise modified corners thereon.

Many operations in the textile industry require the repeated cutting of material to form generally rectangular sheets. When such material is thin and light weight, little difficulty is encountered in such severing operations; however, where the material is heavy, tough, or closely woven, the severing thereof is tedious and time consuming and many problems arise with respect to the various cutting operations to be performed thereon.

The conventional method of transversely cutting such heavy materials is to lay out long lengths on a table, in layers if desired, measure manually the required shorter lengths, and manually force an electrically driven knife, either circular or vertical, across the material at the measured point. Where rounded corners are required on sections severed by the foregoing procedure, it is often manually accomplished by hand shears or other suitable means. In addition to being time consuming such conventional methods have the attendant disadvantage of high waste resulting from errors and inaccuracies in measuring and cutting.

One of the objects of this invention, therefore, is to overcome these and many other problems encountered with conventional methods by the provision of a new and improved cutting machine which automatically effects a plurality of cutting operations on a continuous sheet of relatively heavy material.

It is also an object of this invention to provide a new and improved automatic cutting machine which is capable of cutting sections of a wide range of lengths and widths from a continuous sheet of material.

Another object of this invention is to provide a new and improved cutting machine which not only severs automatically measured lengths of material, but cuts the selvage from such material as well as forming each measured length thereof with rounded or otherwise symmetrically modified corners.

A further object of this invention is to provide a new and improved cutting machine in which adjacent corners are cut with a converging radii die stamp prior to transportation of a cutting knife across the material, and without stopping movement of the material through the machine.

An additional object of this invention is to provide a new and improved cutting machine in which the transverse cutting knife intersects the converging radii of the preformed corners so that the severing of a measured length of material is the final cutting operation, with the result that more accurate forming of rounded corners is permitted.

Still another object of this invention is to provide a new and improved loop chain device for accurately measuring predetermined lengths of material and controlling material feeding mechanisms.

The invention also includes as one of its objects that of providing a new and improved method of cutting sections with rounded or otherwise symmetrically modified corners from a continuous sheet of material.

A still further object of this invention is to provide a new and improved automatic cutting machine which is rugged in construction, requiring but negligible maintenance, yet simple in operation and which readily lends itself to the demands of economic manufacture.

Numerous other objects, features and advantages of the present invention will be apparent from consideration of the folowing specification taken in conjunction with the accompanying drawings wherein like designators refer to the same or similar parts throughout and in which:

FIG. 1 is a front elevation of one preferred embodiment of the automatic cutting machine of the present invention.

FIG. 2 is a side elevation of that form of the invention illustrated in FIG. 1.

FIG. 10 illustrates the manner in which the continuous sheet of heavy material is severed by the apparatus of the present invention to provide rounded corners thereon.

FIG. 11 is an electrical schematic of one form of control circuit suitable for use with the apparatus of the present invention.

Figure 4:
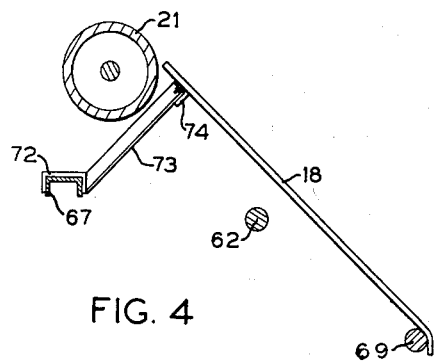
FIG. 4 is a detail, in vertical cross section, showing the central apron support arrangement of the present invention.

Referring now more particularly to the drawings, that form of the invention here shown by way of illustration includes a generally conventional frame having an enclosed base 14 with upstanding end frames at 15 and 16 suitably braced by cross channels. At the input end of the machine, as shown in FIG. 1, material to be cut is adapted to be evenly supported by inclined coplanar aprons 17, 18 and 19 which guide the material to companion, feed and pressure rollers 21 and 22, respectively. Feed roller 21 is supported by its terminal journals 23 and 24 extending through pillow blocks 26 and 27 which are secured to the end frames 15 and 16, respectively For rotating feed roler 21, a main drive motor 28 supported from the base 14 of the machine couples power through the selectively operable clutch unit 30 to the gear reducer 31 by way of the pulleys 32 and 33 and pulley drive belt 34. Gear reducer 31 is bolted to the shelf 36 which is supported by strut 37. Output gear 38 of gear reducer 31 is connected by link chain 40 to feed roller drive gear 41 which is keyed to journal 23 between the pillow block 26 and feed roller 21.

Pressure roller 22 maintains positive engagement of the material with feed roller 21 as it drives material therepast, the arrangement being such that the terminal journals of roller 21 are supported in pillow blocks, as at 42, that are mounted on carrier arms 43 which are pivotally secured to the end frames 15 and 16, as at 44, so as to position the weight of pressure roller 22 on feed roller 21.

After the material has passed into the machine for the various cutting operations thereon to be hereinafter described, it is removed as by passing between the take-off roller 46 and pressure roller 47. Take-off roller 46 is supported similarly to feed roller 21, being driven therewith by the belt drive 48 which extends outside of end frame 16 from the pulley 50 on the end of feed roller journal 24 to a similarly secured pulley on the end of the take-off drive roller journal. Pressure roller 47 maintains the material against take-off drive roller 46 for positive engagement therewith by the pressure of its own weight, being rotatably secured in pillow blocks, as at 51, which are mounted on carrier arms 52 that are pivoted to the end frames, as at 53. It is to be noted that take-off roller 46 is driven slightly faster than feed roller 22 so as to maintain tension on the material during the cutting operations.

Considering now the apparatus for performing the various cutting operations on the material passing through the machine, selvage or irregular excess outside bordering material is first removed by a pair of rotary blades 55 and 56 extending through slots as at 57, in the side aprons 17 and 19. Referring now particularly to that side of the machine near end frame 15, it being understood that both sides are the same, driving rotary blade 55 is a motor 58 bolted under the apron on a motor mount 60 which is welded at its forward end to a cylindrical bracket 61 that is adjustably positionable along the transverse rod 62, the latter being bolted to the outwardly offset supporting arm 63 which is secured to end frame 15. From this construction it will be apparent that offset supporting arm 63 permits movement of motor mount 58 beyond end frame 15 so that the maximum width of material will be determined solely by the distance between end frames 15 and 16.

The invention also provides for movement of apron 17 with motor mount 60 so as to maintain cutting blade 55 centered in apron slot 57. For this purpose a guide bar 65 is welded to the inside of the slidable cylindrical bracket 61 and terminates in an inverted U-member 66 that is adapted to ride on cross channel 67 which is supported from end frames 15 and 16. Midway along guide bar 65 is welded an inverted stub channel 68 for supporting the rearward end of the motor mount. Mounted on stub channel 68 is upright brace 70 which has apron supporting bar 71 welded to the upper end thereof. The lower end of side apron 17 slidably rests on transverse rod 69 which is suitably supported from end frames 15 and 16.

Central apron 18 is removably supported from cross channel 67 so as to simplify maintenance and permit the side apron assemblies to be moved next to each other to provide for selvage cutting of narrow sheets. For this purpose, an inverted U-member 72 is removably fitted over cross channel 67 with inclined bracing bar 73 welded at its lower end to U-member 72 and at its upper end to cross iron 74 which is suitably bolted to the apron. The lower end of central apron 18 rests over the transverse rod 62 in a manner similar to that of the side apron.

Maintaining the material against side apron 17 to provide for clean edge cutting is the slotted pressure plate 76 which has a semi-circular blade shield 77 welded thereto for operator protection. Retaining pressure plate 76 in position are the companion arms 78 and 80 which are pivotally secured to offset rod 81 that is supported from the top motor mount back plate 82 which extends upwardly from the rear of motor mount 60.

Figure 6:
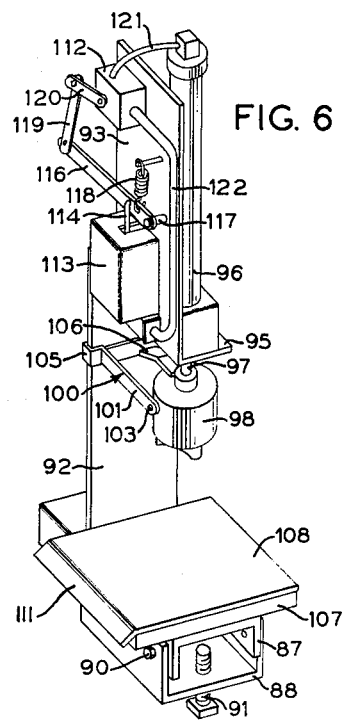
FIG. 6 is an enlarged perspective view of one of the die-cutting mechanisms of the present invention.
Figure 7:
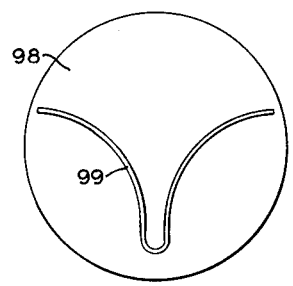
FIG. 7 is a plan view of the face of the die of one of the die-cutting mechanisms of the present invention.

After the material has passed through the feed and pressure rollers, a second cutting operation is performed on the side edges thereof by a pair of confronting radius stamping mechanisms generally indicated in FIGS. 1 and 2 at 83 and 84, shown in detail in FIGS. 6 and 7. To support the radius cutting mechanisms, cross beam 86 is transversely supported between end frames 15 and 16. Providing for adjustable positioning of the radius cutting mechanisms on cross beam 86 is an inverted channel base 87 which is adapted for complementary slidable registration with supporting cross beam 86, the arrangement being such that upwardly opening channel stub 88 is bolted as at 90 to channel base 87. To selectively position the radius cutting mechanisms on cross beam 86, channel base 87 has clamping screw 91 threaded centrally therethrough, so as to permit alignment with the selvage cutting blades.

Mounted on channel base 87 is an upstanding back plate 92 of T-shaped cross section, having welded thereto an L-shaped center support plate 93, with the flange 95 at the base thereof securing conventional pneumatic air cylinder 96, which is adapted to drive a plunger 97 in a vertical, reciprocating motion. Secured to the bottom end of plunger 97 is the steel die head 98, having a cutting edge 99 of generally V-shaped configuration on the face thereof so as to form a pair of converging radii, as shown in FIG. 7.

Directing die head 98 in its downward stroke is guide bracket 100 which is formed with a pair of spaced arms 101 and 102, being secured thereto by die-head cross bolt 103. Each arm is formed at the base plate end thereof with an inwardly opening U-shaped channel 105 that is adapted to ride one of the outside edges of the upstanding back plate. Bolted to die head 98 to prevent pivotal movement thereof about the arm securing cross bolt 103 is the finger 106 which retains arms 101 and 102 in fixed spaced relation.

Mounted on channel base 87 is the steel base block 107 which has thereon an aluminum face plate 108 that presents a soft cushion for the downward blow of the die head. To facilitate feeding of material thereacross, the radius cutting mechanism support arrangement is such that face plate 108 is approximately the same level as forward baseboard 109 which supports the material coming out of the feed roller. To permit selective inward positioning of the radius cutting mechanisms, each side of baseboard 109 is provided with laterally extending cutouts, as at 110 in FIG. 8, which allow movement of base block 107 and face plate 108 therein. Face plate 108 is also formed with a downwardly inclined apron 111 over which the material rides onto the central portion of face plate for the radius stamping operation.

Controlling operation of air cylinder 96 is a two-way valve 112 which is operated by electrical solenoid 113, the arrangement being such that solenoid plunger 114 causes link 116 to pivot about pin 117 against the tension of spring 118, so as to actuate connection arm 119 and link 120. Downward actuating air pressure is carried to the upper end of air cylinder 96 from two-valve 112 by way of air line 121. In like manner, return of die head 98 is effected by air pressure in line 122 from the valve 112 to the lower end of air cylinder 96, the arrangement being such that input air pressure is carried to directing valve 112 by main pressure line 123 from a suitable source, not shown. With solenoid 113 in its normally de-energized condition, valve 112 is so positioned as to direct actuating pressure through line 122 to the lower end of air cylinder 96 so as to maintain die head 98 in "up" position. Momentary energization of solenoid 113 causes such rotation of valve 112 as to drive die head 98 in its downward stroke, with quick-return of valve 112 being effected by spring 118 after de-energizattion of solenoid 113, so as to again direct "up" pressure into air cylinder 96.

Figure 9:
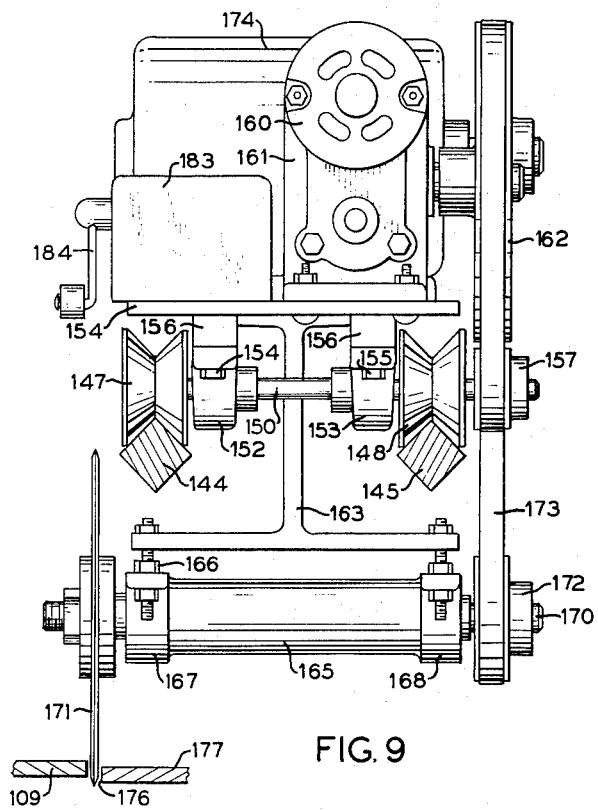
FIG. 9 is an enlarged end view of the transverse saw cutter of the automatic cutting machine of the present invention.
Figure 8:
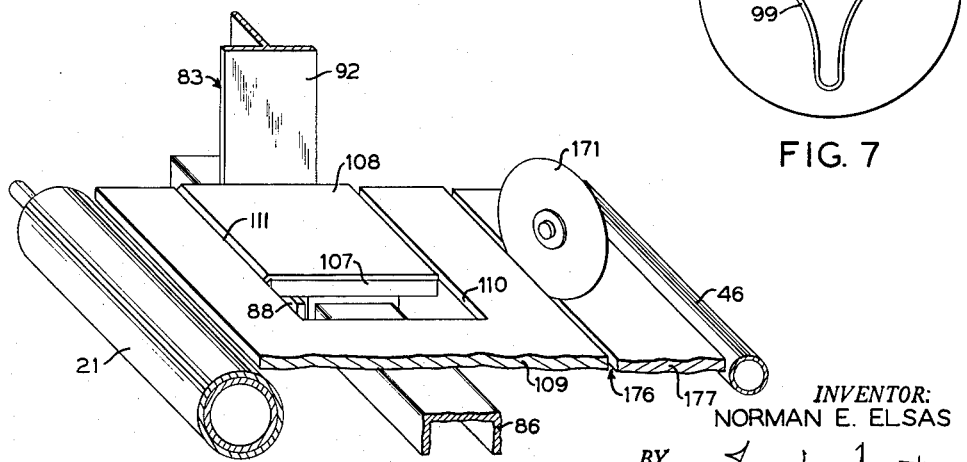
FIG. 8 is perspective detail, partly broken away, schematically illustrating the relationship of one of the radius cutting mechanisms with the transverse cutting knife.

Referring now more particularly to FIGS. 8, 9 and 10, after the material 138 has received confronting edge radial cuts 140, it is cut transversely, as at 141, by transportation of cutting trolley 142 thereacross exactly where the opposing radial cuts were made, with the thickness of the transverse cut being small as compared to the width of the extended stem or apex of the generally V-shaped die so as to allow a positioning tolerance while effecting clean, rounded corners on the material.

Supporting trolley 142 for its transversely reciprocating motion are a pair of spaced parallel tracks or rails 144 and 145, each being mounted from end frames 15 and 16 by L-shaped, outwardly offset brackets, as at 146. Tracks 144 and 145 are square in cross section but rotated 45° so as to present an apex thereof upwardly for complementary rolling registration with front and rear sets, 147 and 148 respectively, of V-grooved trolley wheels. As shown more clearly in FIG. 9, front and rear wheels are similarly supported, with rear wheels 148 being fixed to axle 150 which is journaled in pillow blocks 152 and 153, the latter being secured to the underside of trolley deck 154 by bolts 155 passing through spacer blocks 156. Rear wheel axle 150 is extended at one side thereof so as to mount pulley 157. Driving power for the trolley is coupled to pulley 157 from electric motor 160 through the right angle drive unit 161 and pulley belt arrangement 162.

Welded to trolley deck 154 and extending downwardly therefrom between tracks 144 and 145 is an inverted T-beam 163 to which the saw mandrel 165 is adjustably bolted, as at 166, for varying drive belt tension. Extending axially through the saw mandrel 165 for rotatable support in mandrel end bearings 167 and 168 is the drive shaft 170 which has rotary cutting blade 171 suitably secured to one end thereof. Fixed to the other end of shaft 171 is pulley 172 which is driven by belt 173 from electric blade driving motor 174 mounted above trolley deck 154. Rotary cutting blade 171 protrudes into a transverse slot 176 formed by suitable spacing of forward baseboard 109 from rearward baseboard 177, the latter being also secured to end frames 15 and 16. Rearward baseboard 177, however, is mounted slightly below forward baseboard 109 to facilitate movement of the leading edge of cut material, which is being pushed thereacross by feed roller 21. Rearward baseboard 177 also functions to guide the material onto take-off roller 46.

Supplying electric power to the trolley as it reciprocates across the machine is power cable 179 which is carried by traveler rings 178 that freely ride on overhead rod 180. Supporting rod 180 from end frames 15 and 16 are the upstanding arms 181 and 182, respectively, which are bolted to offset track mounting bracket 146.

Figure 5:
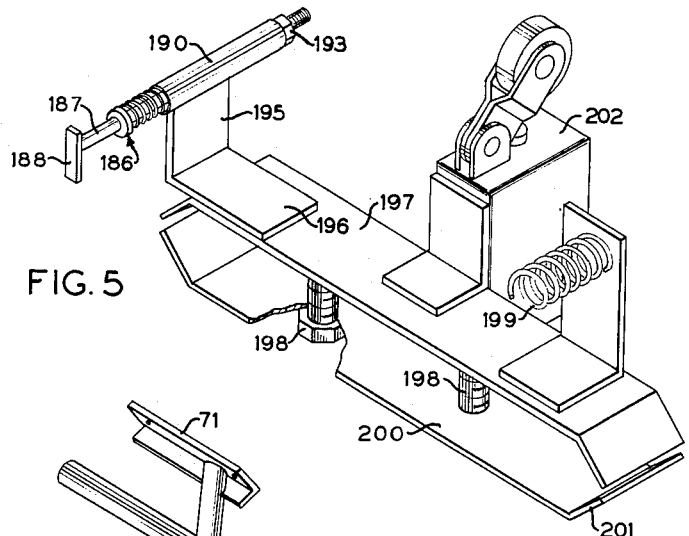
FIG. 5 is a detail, in perspective, showing the mounting arrangement of reversing switch actuator for the trolley drive motor, the terminal shock absorber, and the terminal switch for opening the clutch solenoid circuit.
Figure 3:
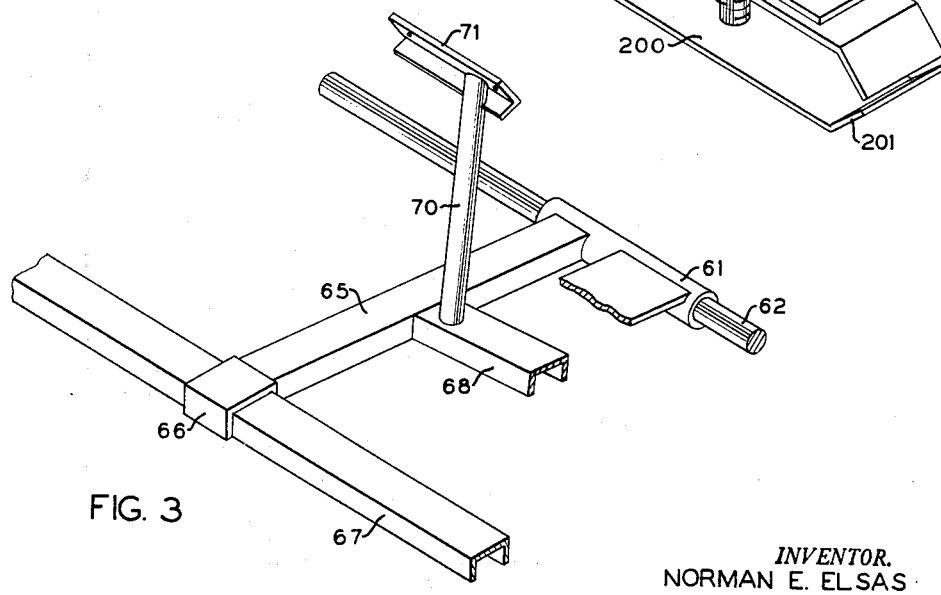
FIG. 3 is a detail, in perspective, showing a side apron and selvage cutting motor support arangement according to the present invention.

Mounted on the topside of trolley deck 154 is the double-pole, double-throw reversing switch 183, having toggle arm 184 which is adapted to be actuated as the trolley reaches end frame 16 so as to reverse trolley drive motor 160. For this purpose, an actuator assembly 186, shown in detail in FIG. 5, is secured to tracks 144 and 145 adjacent end frame 16. Actuator assembly 186 is particularly characterized by an elongate rod 187 having a bumper 188 at the inward end thereof. The rod is slidably supported by guide sleeve 190, being shock mounted therewith by spring 191 which is retained between guide sleeve 190 and collar 192 fixed to the rod as by welding. Rod 187 is retained in guide sleeve 190 by nut 193 which is threaded onto the outer end thereof. Each guide cylinder 190 is welded to an upstanding bracket 195 which is formed with an offset horizontal base flange 196 for securement to cross plate 197 that rests on the trolley tracks. To provide for selective positioning and securement of reversing switch actuator assembly 186, bolts 198 pass between the tracks for releasably securing retainer plate 200 thereunder, the arrangement being such that the outer ends of cross plate 197 and retainer plate 200 are formed with confronting end flanges, as at 201, to effect centering thereof on the tracks. To cushion the approach of the trolley to the end frame, a suitably mounted spring 199 projects inwardly for abutment with the end edge of the trolley deck. Also mounted on cross plate 197 for positioning therewith is toggle switch 202 which is actuated by the trolley as it approaches its end of travel. To actuate switch 202, finger 203 is welded to trolley deck, extending out therefrom transversely of the machine.

In like manner, as the trolley approaches end frame 15, trolley drive reversing switch 183 is adapted to be operated by actuator assembly 206, on which is mounted toggle switch 207 for actuation by finger 208 which extends from trolley deck 154 oppositely to finger 203.

To permit selection of the distance between transverse cuts in the material passing through the machine, journal 23 of feed roller 21 is fitted with sprocket 210 for rotation therewith beyond pillow block 26. Loop chain 211 hangs loosely over sprocket 210 having its free end coupled to the idler sprocket 212 from which depends the elongate weight 213 as secured by the U-bracket 215, the arrangement being such that pin 216 rotatably supports idler sprockets 212 in U-bracket 215 which has its base bolted to weight 213. Pinned to chain 211 for movement therewith is the cam or lug 217 which is adapted to actuate the switches 218 and 220, secured to end frame 15, which initiate sequential operation of the radius cutters and traversing saws. It will be noted that the sprocket 210 need not be mounted directly on the shaft of the feed roller, but may be geared to it by any suitable arrangement so that the rotation of the sprocket may be in any desired ratio with respect to the number of rotations of the feed roller of known circumference. It should also be apparent that by providing a longer or shorter loop chain 211, the amount of rotation of the roller and hence the length of material fed between cuts can be varied commensurately, thus providing a simple but accurate mechanism for changing such length.

A suitable circuit for operation with the above described apparatus is depicted schematically in FIG. 11, simplified by leaving out conventional fusing or other protective devices as is well understood by those skilled in the art. Three-pole single-throw line switch 221 closes the circuit from a suitable three-phase, three-wire source, generally designated L1, L2 and L3, to the control system of the present invention, thereby immediately energizing feed roller drive motor 28, trolley saw motor 174 and selvage cutting motors 58 and 222. As material is being fed into the machine, measurement thereof for the particular cutting operation to be performed is made by loop chain 211 which carries the switch actuating lug 217 as hereinabove described.

The first encountered normally open switch 218 is actuated by the chain lug 217 to momentarily complete the circuit therethrough in series with the die-head solenoid 113 across lines L1 and L2, resulting in momentary energization of die-head solenoid 113 which effects actuation of cylinder control valve 112 to drive the die head in a downward stroke. After such momentary energization of solenoid 113, air cylinder valve 112 is instantly returned to its normal position by spring 118, thereby directing "up" pressure to air cylinder 96 to effect return of die head 98. Continuing past the switch 218, chain lug 217 next actuates the normally open switch 220 so as to energize the de-clutching solenoid 223 which is in series therewith across lines L1 and L3. Energization of solenoid 223 causes upward movement of the clutch arm 225 thereby disengaging clutch 30 so as to stop rotation of roller 21 whereby the material in the machine is stopped at a predetermined spot with lug 217 maintaining switch 220 in closed position. Such upward movement of clutch arm 225 actuates three-pole single throw switch 226 which connects trolley drive motor 160 across lines L1, L2 and L3 so as to cause the trolley to transport the rotary cutting knife across the material.

Upon reaching the other side of the machine, trolley deck finger 203 actuates the single-pole, normally closed switch 202 which is in series with the clutch solenoid 223 across lines L1 and L3 so as to break the energizing circuit to the clutch solenoid. As a result of operation of switch 202, clutch actuating arm 225 pivots downwardly to permit opening of trolley drive motor switch 226, and motor 28 returns to driving engagement with feed roller 21 whereby movement of the material through the machine is resumed. Simultaneously with the opening of normally closed switch 202, elongate rod 187 actuates trolley drive reversing switch 183 mounted on the trolley deck, so as to effect phase reversal of lines 227 and 228 to the motor, with the result that the next energization of motor 160 drives trolley 142 in the reverse direction. After the chain lug 217 travels around the loop, it encounters normally open switch 218 again, so as to actuate die-head solenoid 113 as heretofore described, thereby causing a notch to be cut into both sides of the material. Continued movement of the lug results in actuation of normally open switch 220 so as to energize clutch solenoid 223 which disengages the drive to the feed roller. It will be noted that since the chain measuring device is driven by the feed roller, the chain stops in such position that lug 217 remains on second switch 220 to retain it in closed position.

Upward movement of clutch arm 225 as a result of the energization of solenoid 223 causes actuation of three-pole single-throw switch 226 mounted thereabove, so as to again energize trolley drive motor 160, but in reverse direction as predetermined by the position of reversal switch 183. The trolley, then, again transports the cutting blade across the machine, intersecting the preformed notches as hereinabove described, and upon reaching the other side thereof, trolley deck finger 208 actuates normally closed switch 207 so as to de-energize clutch solenoid 223 and thereby permit engagement of main drive motor 28 with feed roller 21 so as to resume feeding material through the machine.

In this manner, the cutting machine of the present invention automatically effects a plurality of cutting operations on a continuous sheet of relatively heavy material. The invention not only provides a simplified arrangement for measuring predetermined lengths of material but effects the above described cutting operations with only one stoppage of the material through the machine thereby providing for high speed operation. It is further to be noted that the present invention provides for the transverse cutting blade to intersect the converging radii of the preformed corners so that severing of the measured lengths of material is the final cutting operation, with the result that more accurate formation of rounded corners is effected. It should, of course, be recognized by those skilled in the art that other configurations of corners would be permitted with the apparatus of the present invention.

From the foregoing it is apparent that I have provided an automatic cutting machine which is well adapted to fulfill the aforestated objects of the invention. Moreover, whereas the invention has been described with respect to a particular embodiment thereof, it is well understood by those skilled in the art that other embodiments or modifications thereof may be resorted to without departure from the spirit or scope of the invention as defined by the appended claims.

I claim:

1. A machine for cutting successive sections from a sheet of textile material comprising a frame, a feed roller mounted on said frame for feeding said textile material longitudinally of said frame, a motor driving said feed roller, a pair of transversely movable selvage cutters mounted on opposite sides on said frame for trimming the selvage of said textile material as it is passed thereby, a pair of transversely movable die heads mounted on opposite sides of said frame and alignable with said selvage cutters for cutting notches on opposite sides in said material, means for actuating said die heads, a transversely movable knife carried by said frame for moving across said material from one side of said material to the other for cutting said fabric along a line between said notches, and means for actuating said knife in response to the stopping of movement of said sheet.

2. A machine for cutting successive sections from a sheet of textile material comprising a frame, a feed roller mounted on said frame for feeding said textile material longitudinally of said frame, a motor driving said feed roller, a pair of transversely movable selvage cutters mounted on opposite sides on said frame for trimming the selvage of said textile material as it is passed thereby, a pair of transversely movable die heads mounted on opposite sides of said frame and alignable with said selvage cutters for cutting notches on opposite sides in said material means for actuating said die heads, a transversely movable knife carried by said frame for moving across said material from one side of said material to the other for cutting said fabric along a line between said notches, means for actuating said knife, means for arresting the feed of said material during the transverse cutting of said fabric by said knife and variable means coupled with said roller for controlling said means for actuating said knife and said means for actuating said die heads such that a preselected variable amount of material is fed by said roller between each actuation of said die heads and said knife.

3. A machine for cutting sections from a continuous sheet of textile material comprising a frame, means on said frame for intermittently feeding a sheet of textile material along said frame, continuously operable transversely adjustable means mounted on said frame for cutting selvage from each side of said material, intermittently operable transversely adjustable means mounted on said frame and longitudinally aligned with said first mentioned means for forming adjacent radius cuts on each side of said material, and intermittently operable means mounted on said frame for creating a transverse cut to sever substantially rectangular sections from a continuous sheet, and variable control means responsive to the feed of a sheet of material, for coordinating the actuation of said radius cut forming means and said transverse cut creating means so as to form rounded corners on the substantially rectangular sections served by said transverse cut creating means.

4. Apparatus as set forth in claim 3, wherein said means for forming adjacent radial cuts includes a pair of opposed transversely movable members each having a die head, a stamping plate, transversely movable means on said frame for actuating said die head, and means for supporting said means for actuating said die head and said stamping plate.

5. Apparatus as set forth in claim 3, wherein said means for creating a transverse cut includes a pair of rails in a horizontal plane, a trolley adapted to move transversely across said machine on said rails, motor means on the top of said trolley for moving said trolley on said rails, a saw blade rotatably supported from said trolley, and means responsive to said motor means for actuating said saw blade.

6. In a textile fabric cutting machine having a frame for supporting said fabric, a pair of guide rails supported in a horizontal plane by said frame over said fabric, a cutting trolley adapted to ride on said rails comprising, a deck, a first pair of wheels secured to the underside of said deck for registration with the top of said rails, a second pair of wheels secured to the underside of said deck for registration with the top of said rails, a depending support secured to the underside of said deck and extending between said rails, a cutting blade for engaging said fabric, means for rotatably mounting said cutting blade on said support, a first motor mounted on said deck, means for driving said cutting blade from said first motor, a second motor mounted on said deck, and means for driving certain of said wheels from said second motor.

7. Apparatus as set forth in claim 6 and further including a reversing switch mounted on said deck, a circuit for energizing said second motor including said reversing switch, and means supported from said rails for actuating said reversing switch.

References Cited by the Examiner

UNITED STATES PATENTS

| | | | |
|---|---|---|---|
| 126,673 | 5/72 | Busell | 83—692 |
| 843,875 | 2/07 | Dunham | 83—683 |
| 1,017,697 | 2/12 | Carroll | 83—692 |
| 1,260,088 | 3/18 | Spiegel | 83—406 |
| 1,837,727 | 12/31 | Novick | 164—64 |
| 1,843,161 | 2/32 | Ingram | 83—371 |
| 1,869,177 | 7/32 | Thompson | 164—15 |
| 1,958,537 | 5/34 | Glass | 83—255 |
| 2,040,799 | 5/36 | Swift | 164—50 |
| 2,102,170 | 12/37 | Stern | 83—917 |
| 2,369,617 | 3/45 | Somerville | 164—15 |
| 2,374,376 | 4/45 | Olney | 164—15 |
| 2,482,711 | 9/49 | Jensen | 83—213 |
| 2,648,380 | 8/53 | Socke | 164—17 |
| 2,713,904 | 7/55 | Ostuw et al. | 83—208 |
| 2,728,392 | 12/55 | Marsh et al. | 83—371 |
| 2,765,036 | 10/56 | Harper | 164—50 |
| 2,823,749 | 2/58 | Chamberlain | 83—484 |
| 2,836,018 | 5/58 | Key | 83—301 |
| 2,846,005 | 8/58 | Wilson | 83—484 |
| 2,850,090 | 9/58 | Biel et al. | 164—17 |

ANDREW R. JUHASZ, *Primary Examiner.*

ARTHUR B. MILLER, CARL W. TOMLIN, WILLIAM W. DYER, Jr., *Examiners.*